United States Patent
Morishita (10) Patent No.: US 7,652,698 B2
(45) Date of Patent: Jan. 26, 2010

(54) SHADING CORRECTION CIRCUIT OF ELECTRONIC CAMERA

(75) Inventor: Akihiko Morishita, Hiratsuka (JP)

(73) Assignee: Nikon Corporation, Tokyo (JP)

(*) Notice: Subject to any disclaimer, the term of this patent is extended or adjusted under 35 U.S.C. 154(b) by 755 days.

(21) Appl. No.: 10/843,433

(22) Filed: May 12, 2004

(65) Prior Publication Data
US 2004/0233305 A1 Nov. 25, 2004

(30) Foreign Application Priority Data
May 23, 2003 (JP) ............... 2003-146041

(51) Int. Cl.
*H04N 9/64* (2006.01)
*G06K 9/40* (2006.01)
*H04N 1/40* (2006.01)

(52) U.S. Cl. ............... 348/251; 348/243; 382/274; 358/461

(58) Field of Classification Search ............... 348/243, 348/245, 251; 382/274; 358/461
See application file for complete search history.

(56) References Cited

U.S. PATENT DOCUMENTS 5,398,119 A * 3/1995 Suzuki et al. ............... 358/461
5,572,337 A * 11/1996 Kajitani et al. ............... 358/461
2001/0028392 A1* 10/2001 Yamamoto et al. ........... 348/207
2002/0021456 A1* 2/2002 Toriyama .................... 358/446
2002/0167613 A1* 11/2002 Niko .......................... 348/622
2003/0160772 A1* 8/2003 Kunimi et al. ............... 345/204

FOREIGN PATENT DOCUMENTS

| JP | A 63-299575 | 12/1988 |
| JP | A-6-78224 | 3/1994 |
| JP | A 8-65546 | 3/1996 |
| JP | A 9-167225 | 6/1997 |
| JP | A-10-341379 | 12/1998 |

* cited by examiner

*Primary Examiner*—Sinh Tran
*Assistant Examiner*—Albert H Cutler
(74) *Attorney, Agent, or Firm*—Oliff & Berridge, PLC (57) ABSTRACT

A shading correction circuit of the present invention includes an image pickup device having photo detectors arranged on its receptive surface, and a shading correction part for performing shading correction on an output signal of the image pickup device. The image pickup device has an effective pixel area and an upper optical black part. The shading correction part has a correction coefficient generating part and a correction processing part. The correction coefficient generating part thereof extracts shading variation according to an output of the upper optical black part, and generates a correction coefficient for the shading variation. The correction processing part thereof performs shading correction on an image signal by using the correction coefficient generated by the correction coefficient generating part.

4 Claims, 6 Drawing Sheets

Fig. 8 ations in which like parts are designated by identical reference
SHADING CORRECTION CIRCUIT OF ELECTRONIC CAMERA

CROSS REFERENCE TO RELATED APPLICATION

This application is based upon and claims the benefit of priority from Japanese Patent Application No. 2003-146041, filed on May 23, 2003, the entire contents of which are incorporated herein by reference.

BACKGROUND OF THE INVENTION

1. Field of the Invention

The present invention relates to a shading correction circuit of an electronic camera.

2. Description of the Related Art

Images shot by a solid image pickup device of an electronic camera have local distortion (shading) in amplitude owing to unevenness in illumination from light sources, in transmission of lenses, or sensitivities of sensors, etc. Japanese Unexamined Patent Application Publication No. Sho 63-299575 has been known for a correcting method of such shading. According to this correction method, shading is performed by capturing a uniform luminance surface, storing output values in a memory as correction coefficients for respective pixels, and using the correction coefficients at the time of outputting images that contain a subject.

The shading correction according to Japanese Unexamined Patent Application Publication No. Sho 63-299575 is, however, a complicated procedure because it requires a specific operation for obtaining correction coefficients other than the original operations for obtaining images. Besides, the correction coefficients can vary with environmental changes such as secular degradation of the system. Thus, in order to maintain the precision of the shading correction, the method disclosed therein requires periodical obtainment of the correction coefficients even after finishing reading them once, so that it has to be modified on this point.

In addition, the shading correction method disclosed therein requires a memory for retaining the correction coefficient for each pixel. This is disadvantageous in terms of cost performance since in particular, memories of a larger capacity has been demanded for retaining the correction coefficients recently due to soaring increases in the number of pixels constituting a single image.

SUMMARY OF THE INVENTION

In order to solve the foregoing problems of the prior art, it is an object of the present invention to provide a shading correction circuit which is capable of shading correction of high precision and is adaptable to environmental changes without performing a special operation for correction coefficients in advance.

A description on the present invention will be made below.

According to a first aspect of the present invention, a shading correction circuit of an electronic camera includes an image pickup device having photo detectors arranged on its receptive surface and a shading correction part which performs shading correction on an output signal of the image pickup device.

The image pickup device has an effective pixel area and an upper optical black part. The effective pixel area performs photoelectric conversion on an object image to generate an image signal. The upper optical black part is formed in a horizontal direction of the effective pixel area.

The shading correction part has a correction coefficient generating part and a correction processing part. The correction coefficient generating part extracts a variation in shading according to an output of the upper optical black part, and generates a correction coefficient for the shading variation. The correction processing part performs shading correction on the image signal by using the correction coefficient.

According to a second aspect of the present invention, the correction coefficient generating part of the first aspect further has a block extracting part and a block average value generating part. The block extracting part extracts a block including a plurality of photo detectors from the upper optical black part. The block average value generating part calculates an average value of outputs of the photo detectors included in the block. Then, the correction coefficient generating part generates a correction coefficient by using the average value.

According to a third aspect of the present invention, the block extracting part of the second aspect sections the upper optical black part into a plurality of blocks. In addition, the correction coefficient generating part further has an interpolation calculating part which interpolates average values generated by the block average value generating part to determine an amount of variation in shading. Then, the correction coefficient generating part generates a correction coefficient by using the amount.

According to a fourth aspect of the present invention, the correction coefficient generating part of the third aspect further has a variation determination part and a random number generator. The variation determination part determines a difference between amounts of variation in shading of each pixel and its horizontally adjoining pixel. The random number generator modifies variation points of the amounts of variation in shading with random numbers if the difference in the amounts of variation in shading is smaller than a predetermined value. Then, when a difference between the amounts of variation in shading of each pixel and its horizontally adjoining pixel is smaller than the predetermined value, the variation points are arranged unevenly in a vertical direction of the effective pixel area.

Note that in the foregoing fourth aspect, the random number generator preferably exercises the random number modification when the difference in the amounts of variation in shading of each pixel and its horizontally adjoining pixel is smaller than 1 LSB.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

Hereinafter, an embodiment of the present invention will be described in detail with reference to the drawings.

Configuration of Embodiment

Figure 1:
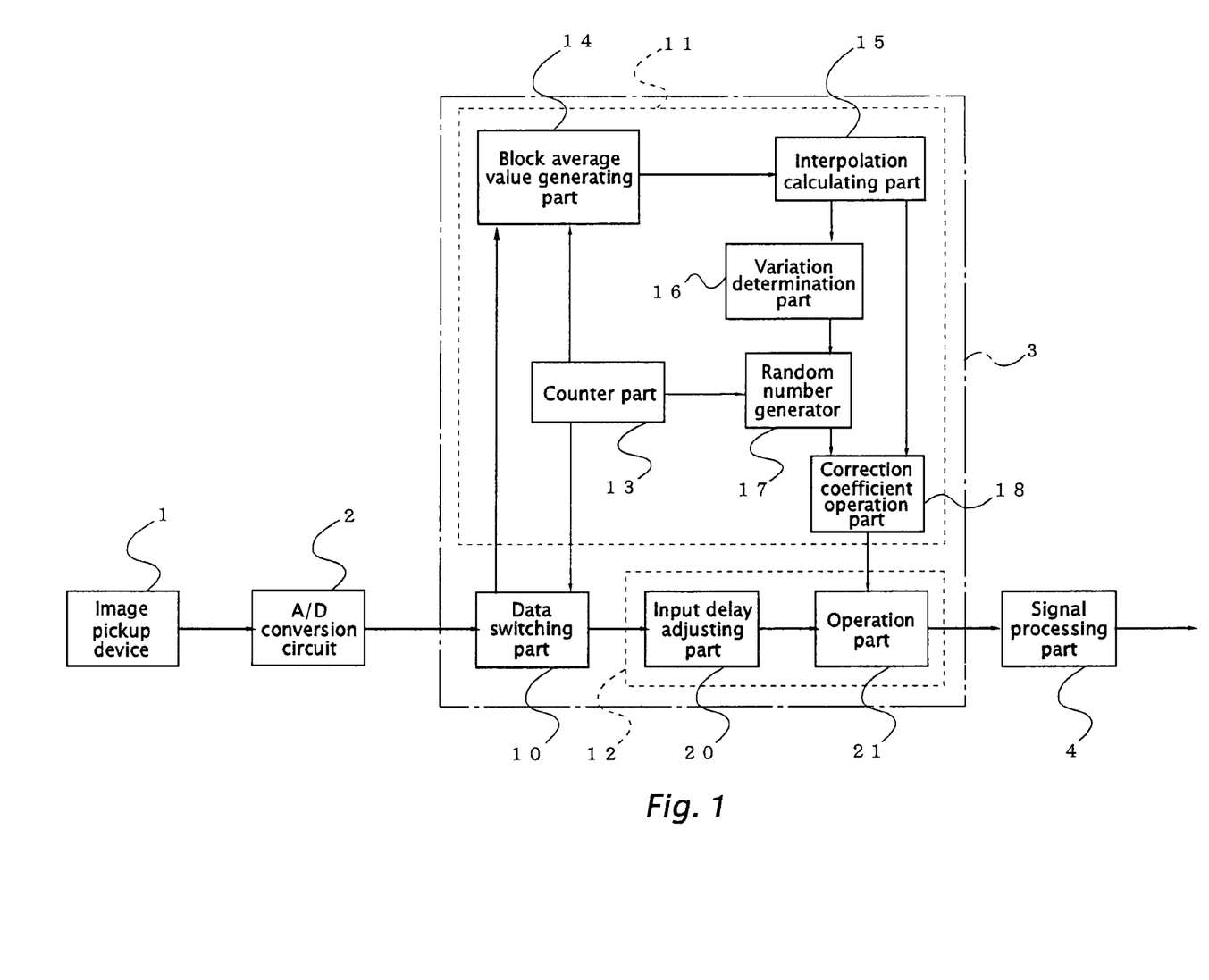
FIG. 1 shows the configuration of a shading correction circuit according to an embodiment of the present invention.

FIG. 1 is a diagram showing the configuration of a shading correction circuit according to an embodiment of the present invention.

The shading correction circuit of this embodiment includes an image pickup device 1, an A/D conversion circuit 2, a shading correction part 3, a signal processing part 4, and a clock generator (not shown) for supplying clocks to the entire circuitry.

Figure 2:
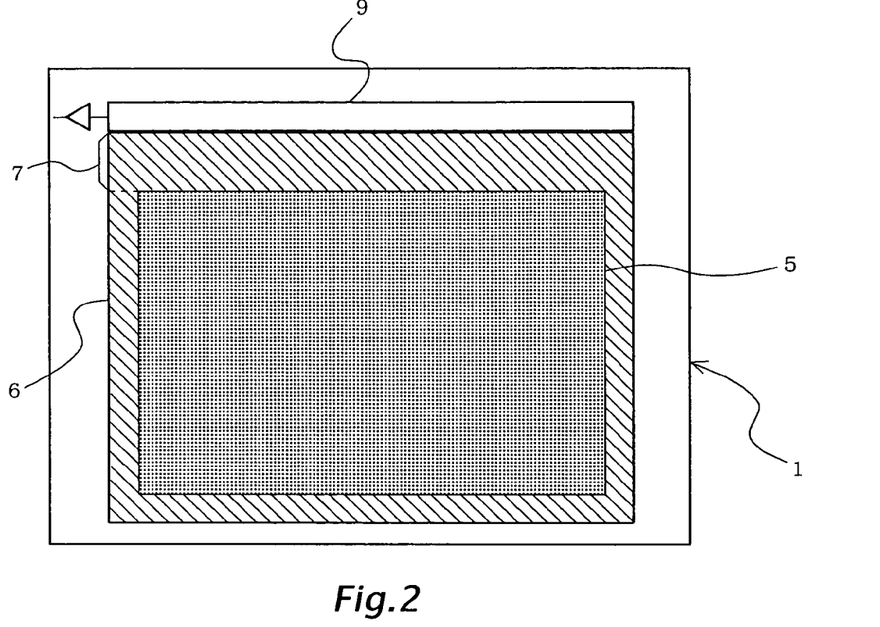
FIG. 2 shows the configuration of an image pickup device according to the embodiment.

Initially, the configuration of the image pickup device 1 of the embodiment will be described with reference to FIG. 2. An effective pixel area 5 and an optical black part 6 are formed on the receptive surface of the image pickup device 1.

The effective pixel area 5 of the image pickup device 1 has photo detectors which are arranged in two dimension. This effective pixel area 5 performs photoelectric conversion on an object image projected onto the receptive surface of the image pickup device 1, thereby generating image signals. This effective pixel area 5 is provided with a color filter array, so that the object image is converted into red (R), green (G), and blue (B) image signals.

The optical black part 6 is formed in the circumference of the effective pixel area 5. This optical black part 6 has photo detectors which are formed in two dimension. The surface of the optical black part 6 is covered with a light shield film. In this embodiment, an upper optical black part 7 is constituted of photo detectors of the optical black part 6 which are positioned on the horizontal lines of the upper side of the effective pixel area 5. The light-shielded photo detectors of the upper optical black part 7 are used to generate shading correction signals.

The effective pixel area 5 and the optical black part 6 (including the upper optical black part 7) both are provided with vertical read lines (not shown) in units of the rows of the photo detectors. A horizontal read line 9 is provided at the output ends of the vertical read lines. The output of the horizontal read line is connected to the shading correction part 3 through the A/D conversion circuit 2.

Note that signals are output from the image pickup device 1 in the following manner. Initially, signals are read from the photo detectors, from left to right in succession, that constitute the topmost horizontal line of the image pickup device 1. Then, upon completion of the signal read of the topmost horizontal line, signals are read from the photo detectors on the immediately below horizontal line, from left to right in succession. Subsequently, the similar process is repeated to read a screenful of signals.

Now, the shading correction part 3 shown in FIG. 1 includes a data switching part 10, a correction coefficient generating part 11, and a correction processing part 12.

The data switching part 10 is connected with the output of the A/D conversion circuit 2. The output of the data switching part 10 is connected to the correction coefficient generating part 11 and the correction processing part 12. The data switching part 10 exercises switching control of outputting the signals of the horizontal lines of the upper optical black part 7 (shading correction signals) to the correction coefficient generating part 11 and outputting the signals of the horizontal lines including the effective pixel area 5 to the correction processing part 12.

The correction coefficient generating part 11 of the shading correction part 3 includes a counter part 13, a block average value generating part 14, an interpolation calculating part 15, a variation determination part 16, a random number generator 17, and a correction coefficient operation part 18.

The counter part 13 contains positional information (the numbers of horizontal lines (area heights) and the number of pixels constituting each horizontal line (area widths) on the effective pixel area 5 and the optical black part 6 (upper optical black part 7) that constitute a single screen. Then, the counter part 13 determines from the clock count if the input signal is a signal from the upper optical black part 7 or not, and instructs the data switching part 10 to switch the output.

The counter part 13 also outputs the relation between the order n of pixels on a horizontal line and the input signal, to the correction coefficient operation part 18 via the random number generator 17. Moreover, the counter part 13 functions as a block extracting part for sectioning the upper optical black part 7 into a plurality of processing units (referred to as blocks 19). That is, the counter part 13 contains positional information on the blocks 19 (the height a, the width b, and the number K of the blocks 19). The counter part 13 is able to extract the shading correction signal for each of the blocks 19 by counting the clocks to issue an instruction to the block average value generating part 14 at each boundary between the blocks 19.

The block average value generating part 14 calculates an average value $A_K$ of the shading correction signal for each block 19 (hereinafter, referred to as average value $A_K$), and outputs a result of the calculation to the interpolation calculating part 15 and the correction coefficient operation part 18.

Here, the shading correction of this embodiment uses the average values $A_K$ of the blocks 19 because if the output of each pixel in the upper optical black part 7 is used for shading correction without any calculation, pixel defects of the photo detectors and high frequency components output from the photo detectors are reflected directly in the correction, which may cause degradation in the precision of the correction.

Figure 3:
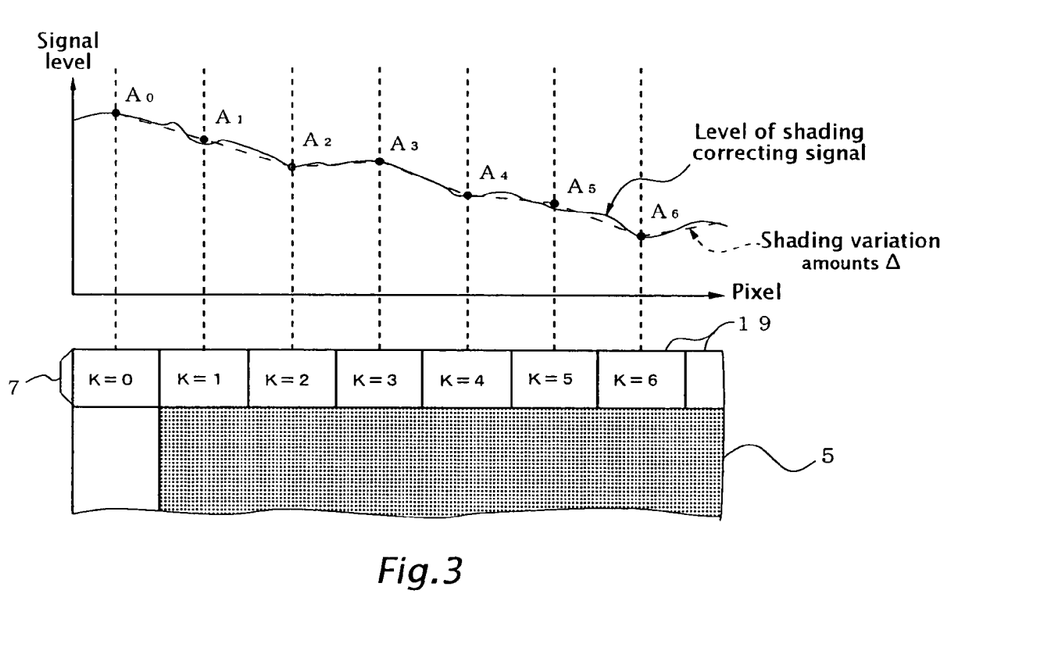
FIG. 3 shows the relationship between the signal level of shading correction and a shading variation amount.

The interpolation calculating part 15 interpolates the average values $A_K$ of the respective blocks 19 to calculate a shading variation amount Δ per pixel. As shown in FIG. 3, shading variation amounts Δ obtained through linear interpolation of the average values of adjoining blocks 19 are closely analogous to the actual level of the shading correction signal. The interpolation calculating part 15 of this embodiment determines a difference between the average values of adjoining blocks 19, or $(A_{K+1} - A_K)$. This difference in average value is divided by the width b of the blocks 19 to calculate a per-pixel shading variation amount Δ within the block 19. The shading variation amount Δ calculated by the interpolation calculating part 15 is output to the variation determination part 16 and the correction coefficient operation part 18.

The variation determination part 16 determines if the per-pixel shading variation amount Δ is smaller than 1 LSB (Least Significant Bit in binary) or not, and notifies the random number generator 17 of the result of determination.

If the result of determination of the variation determination part 16 is greater than or equal to 1 LSB, the random number generator 17 outputs the input of the counter part 13 to the correction coefficient operation part 18 simply. On the other hand, if the result of determination of the variation determination part 16 is smaller than 1 LSB, the random number generator 17 modifies the relation between the horizontal positions of pixels at variation points on the horizontal line and the input signal with random numbers, and outputs the resultant to the correction coefficient operation part 18.

Figure 4:
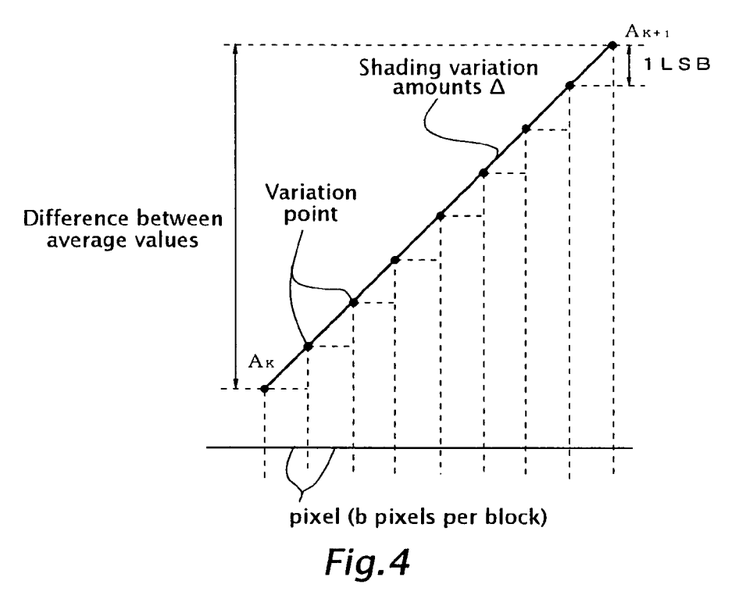
FIG. 4 shows variation points of shading correction when shading variation amounts are greater than or equal to 1 LSB.

Now, why the variation determination part 16 and the random number generator 17 are provided in this embodiment will be described. If a difference between the average values of adjoining blocks 19 is greater than or equal to the block width b, the per-pixel shading variation amount Δ will be greater than or equal to 1 LSB. In this case, as shown in FIG. 4, each pixel in the block 19 is varied by the shading correction. That is, each pixel has the variation point, so that the variation points will be less noticeable in the image.

Figure 5:
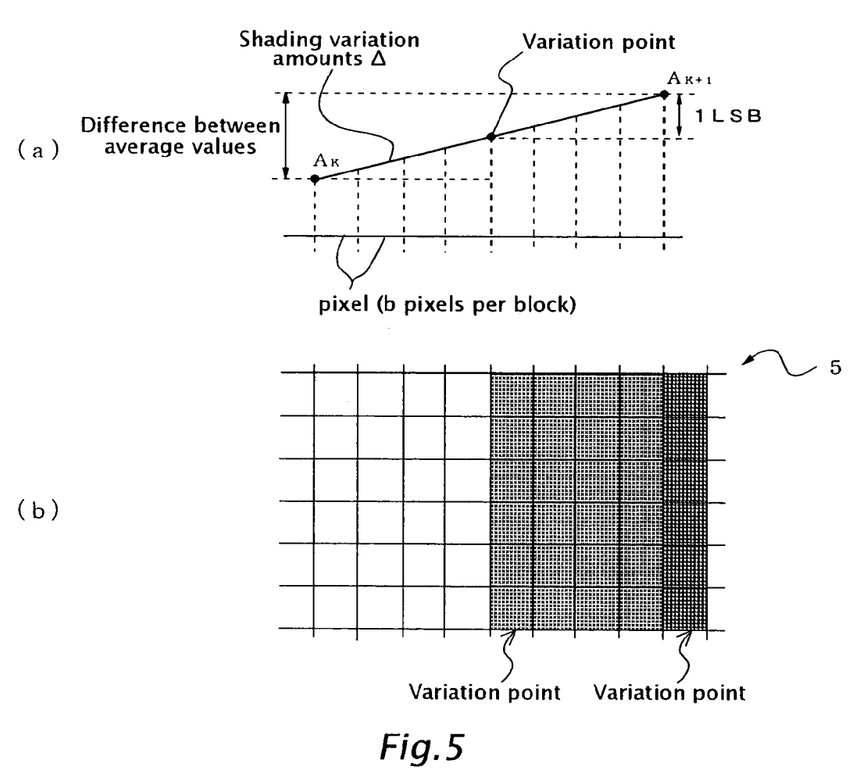
FIG. 5(a) shows variation points of shading correction when shading variation amounts are smaller than 1 LSB.
FIG. 5(b) shows the state of the effective pixel area of FIG. 5(a)

On the other hand, if the difference in the average value is smaller than the block width, the per-pixel shading variation amount Δ falls below 1 LSB. In this case, as shown in FIG. 5(a), it is not possible to give each pixel a variation of smaller than 1 LSB, therefore, shading correction is done such that every several pixels are varied with a variation of 1 LSB. In particular, with an extremely small difference between the average values of adjoining blocks, adjoining pixels have generally uniform outputs, which makes noticeable the pixels with a variation by the shading correction. Besides, the pixels with the variation points by the shading correction are at the same positions in the vertical direction of the effective pixel area 5, so that the variation points may be recognized as vertical stripes in the image (see FIG. 5(b)).

Figure 6:
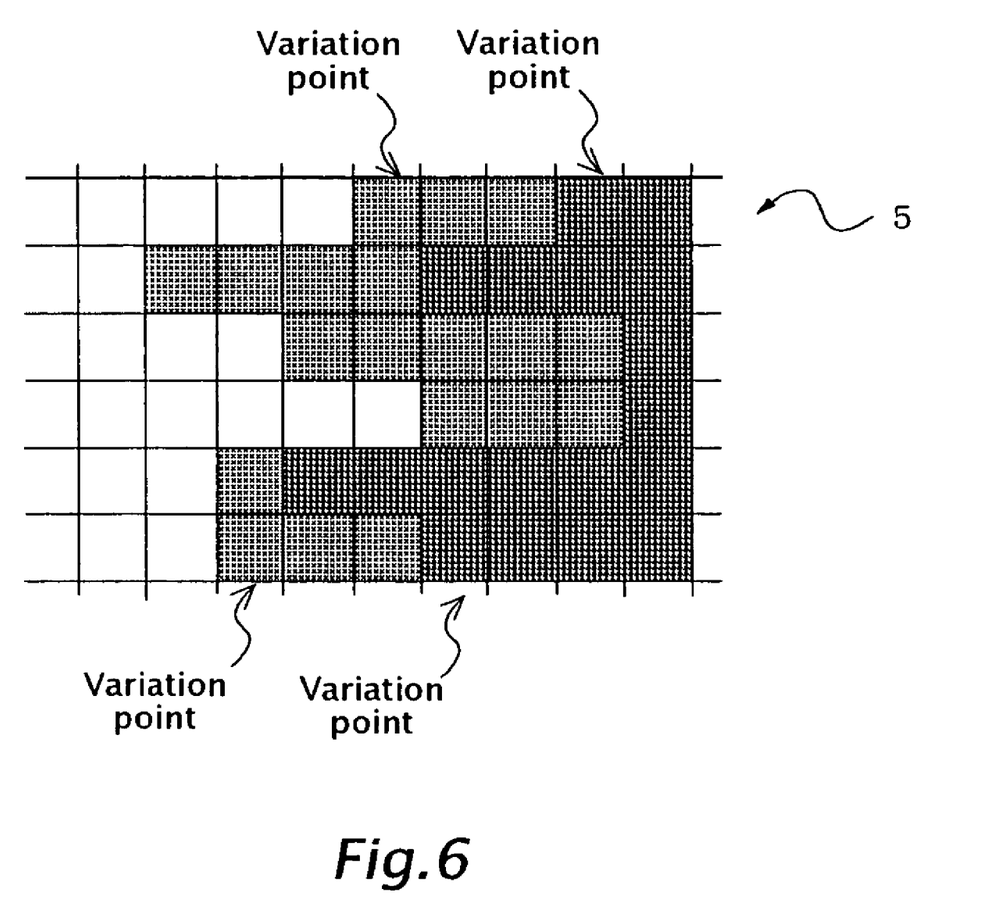
FIG. 6 shows the state of the effective pixel area when the variation points of shading correction are modified with random numbers.

Therefore, in this embodiment, the variation determination part 16 and the random number generator 17 are provided in order to modify, with random numbers, the positions of the pixels with the variation points for subjects of the shading correction in the horizontal direction of the screen, if shading variation amounts Δ between horizontally adjoining pixels are smaller than 1 LSB. Consequently, shading corrected variation points of the pixels are arranged unevenly in the vertical direction of the effective pixel area 5. This makes the variation points less recognizable as vertical stripes in the image (see FIG. 6).

The correction coefficient operation part 18 computes shading correction coefficients $C_n$ according to the relation between the order n of pixels and the image signal in the counter part 13, to the average values $A_K$ generated by the block average value generating part 14, and the shading variation amounts Δ from the interpolation calculating part 15. The correction coefficient operation part 18 outputs the shading correction coefficients $C_n$ to the correction processing part 12.

The correction processing part 12 of the shading correction part 3 includes an input delay adjusting part 20 and an operation part 21. The input delay adjusting part 20 delays the output of the image signal until the correction coefficient operation part 18 computes the shading correction coefficients $C_n$, thereby synchronizing the output of the shading correction coefficients $C_n$ and the output of the image signal. The operation part 21 corrects the image signal input from the input delay adjusting part with the shading correction coefficients $C_n$, and outputs the resultant to the signal processing part 4.

The signal processing part 4 shown in FIG. 1 applies image processing to the image signal after the shading correction processing. The output of the signal processing part 4 is connected to a monitor display part for displaying the image signal on-screen, and to a storing part for compressing and recording the image signal (the monitor display part and the storing part are not shown).

Operation of Embodiment

The shading correction circuit of this embodiment is configured as described above. Hereinafter, the operation of the shading correction circuit of the embodiment will be described with reference to the steps shown in FIG. 7.

Figure 7:
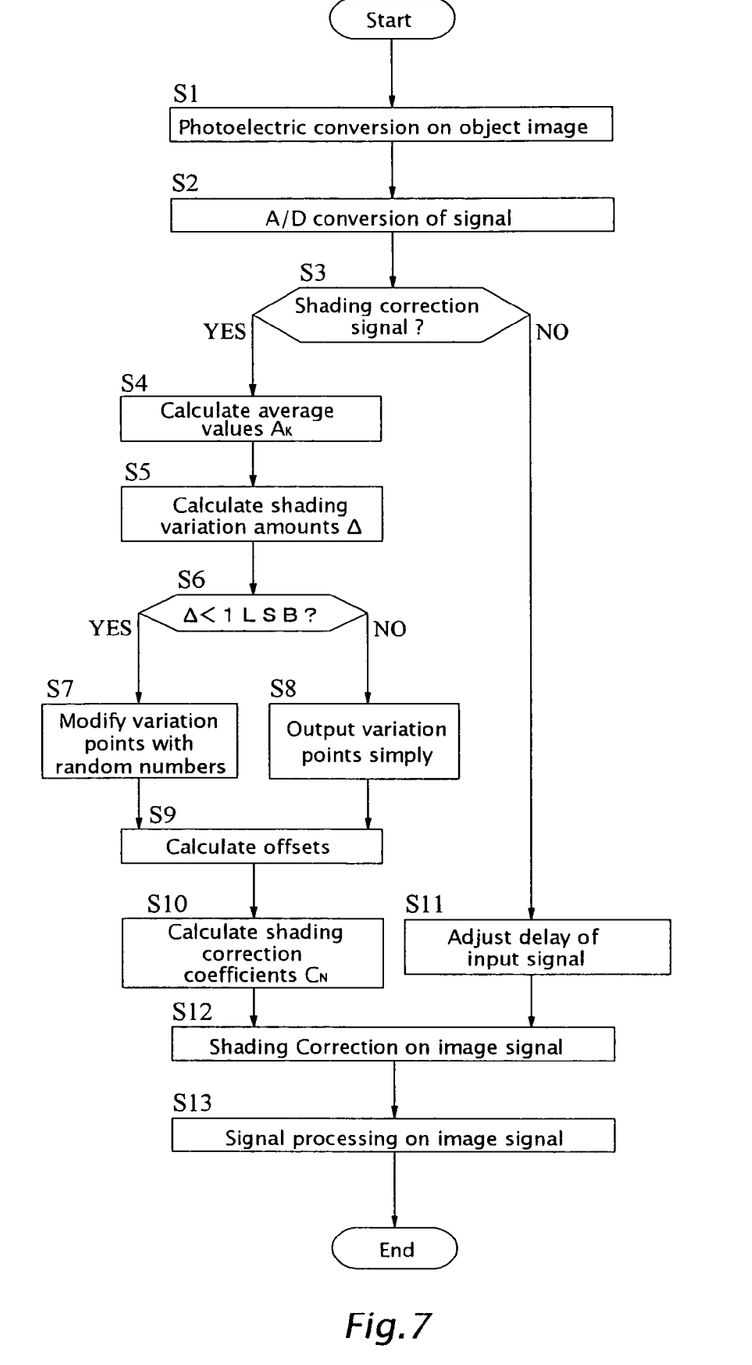
FIG. 7 is a flowchart of the embodiment.

Step S1: The image pickup device 1 performs photoelectric conversion on an object image under an exposure condition determined by a not-shown microprocessor. The image pickup device 1 generates the image signal and shading correction signal and outputs them in synchronization with the clock supplied from the clock generator via the vertical read lines and horizontal read line 9 therein.

Step S2: The A/D conversion circuit 2 performs A/D conversion on the signal output from the image pickup device 1. The A/D conversion circuit 2 outputs the A/D-converted signal to the data switching part 10 of the shading correction part 3.

Step S3: The counter part 13 counts the number of clocks, and determines whether the signal input to the data switching part 10 is the shading correction signal of the upper optical black part 7 or not. If the signal input is from the upper optical black part (YES), the counter part 13 switches the output of the data switching part 10 to that of the block average value generating part 14. Then, the processing moves to step S4. Meanwhile, the counter part 13 outputs the relation between the order of pixels on the horizontal line and the input signal to the random number generator 17.

On the other hand, if the input is not the shading correction signal, i.e., the signal input is from the horizontal lines including the effective pixel area 5 (NO), the counter part 13 switches the output of the data switching part 10 to that of the correction processing part 12. Then, the processing moves to step S11.

Step S4: The block average value generating part 14 adds the shading correction signal of the upper optical black part 7 for each block. The shading correction signal is input in every horizontal line, so that the addition of the shading correction signal for each block 19 is done by the counter part 13, upon counting clocks, issuing an instruction to switch blocks at each boundary between the blocks 19.

Then, the total values of the shading correction signals in the respective blocks are divided by the total number of pixels in a block (a×b) to obtain the average values $A_K$ of the respective blocks. Subsequently, the block average value generating part 14 outputs the average values $A_K$ of the blocks to the interpolation calculating part 15 and the correction coefficient operation part 18. Then, the processing moves to step S5.

Step S5: The interpolation calculating part 15 determines differences between the average values of adjoining blocks 19, or ($A_{K+1} - A_K$), and divides these differences by the width b of the blocks 19 to calculate per-pixel shading variation amounts Δ in the respective blocks. Then, the interpolation calculating part 15 outputs the shading variation amounts Δ to the variation determination part 16 and the correction coefficient operation part 18. Then, the processing moves to step S6.

Step S6: The variation determination part 16 determines if the per-pixel shading variation amounts Δ are smaller than 1 LSB, and notifies the random number generator 17 of the results of determination. If the results of determination are smaller than 1 LSB (YES), the processing moves to step S7. If the results of determination are greater than or equal to 1 LSB (NO), the processing moves to step S8.

Step S7: In this case, the random number generator 17 modifies, with random numbers, the relation between the input signal and the horizontal positions of the pixels at variation points on the horizontal line, input from the counter part 13. As a result, the variation points by the shading correction are arranged unevenly in the vertical direction of the effective pixel area 5. The random number generator 17 outputs the relation to the correction coefficient operation part 18. Then, the processing moves to step S9.

Step S8: In this case, the random number generator 17 outputs the input of the counter part 13 to the correction coefficient operation part 18 without the modification. Then, the processing moves to step S9.

Step S9: The correction coefficient operation part 18 initially calculates offsets ($A_K$–$A_O$) by subtracting the average value $A_O$ of the referential, leftmost block 19 from the average values $A_K$ of the individual blocks 19.

Figure 8:
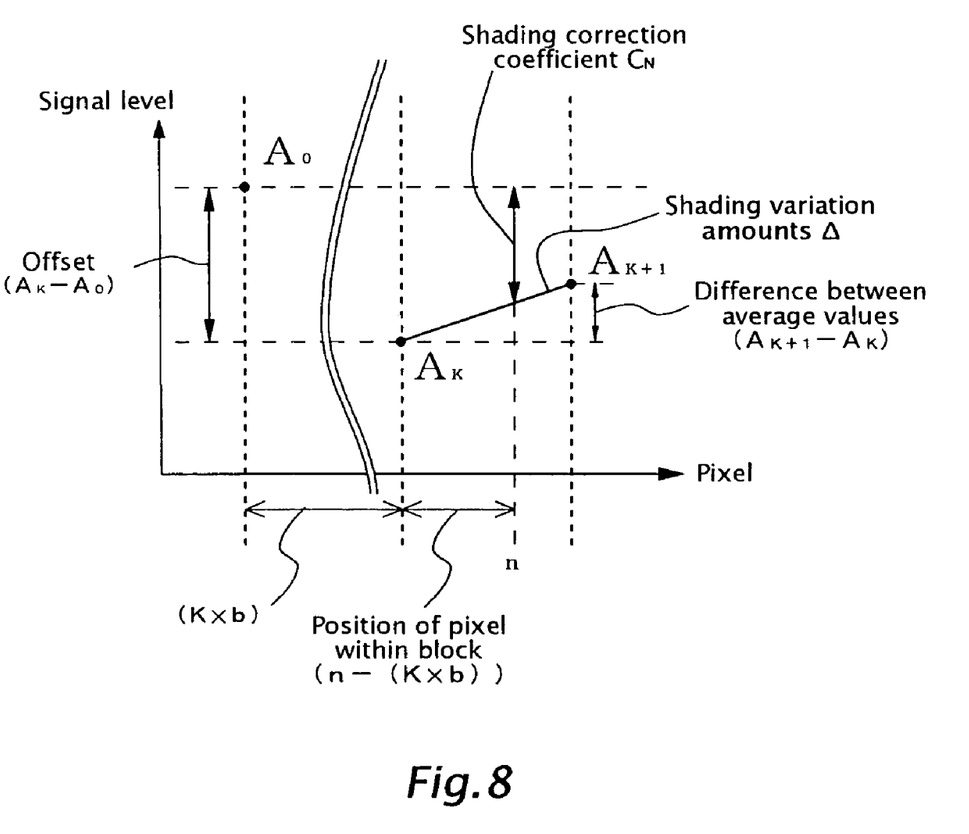
FIG. 8 shows shading correction coefficients.

Step S10: Next, the correction coefficient operation part 18 multiples the shading variation amount Δ of each block by the order (n–K×b) of pixels in the block, and adds the offset ($A_K$–$A_O$) of step S9 to the resultant, thereby computing a shading correction coefficient Cn for each pixel (see FIG. 8). The correction coefficient operation part 18 then outputs the shading correction coefficients $C_n$ to the operation part 21.

Step S11: Meanwhile, the signal of a horizontal line including the effective pixel area 5 is input to the input delay adjusting part 20. After elapse of a predetermined length of delay time, the input delay adjusting part 20 outputs the input signal to the operation part 21. Then, the processing moves to step S12.

Step S12: The operation part 21 performs shading correction on the image signal by subtracting the shading correction coefficients $C_n$ calculated by the correction coefficient operation part 18 from the level of the image signal.

Step S13: The signal processing part 4 performs signal processing such as gamma correction, color separation, and white balance on the shading corrected image signal. The image signal output from the signal processing part 4 is then compressed, encoded, and recorded on a recording medium (memory card etc.).

Effect of Embodiment

This embodiment makes it possible to obtain shading correction coefficients in real time upon each shooting by using the signals of the upper optical black part. This therefore realizes shading correction of high precision at all times without the necessity for a memory for retaining correction coefficients.

Moreover, in this embodiment, the shading correction coefficients are obtained in the course of a shooting operation. This eliminates the need for a special operation for obtaining correction coefficients, with a significant reduction in complexity.

Furthermore, according to this embodiment, the variation points by shading correction are unevenly arranged in the vertical direction of the effective pixel area when per-pixel shading variation amounts are small. This corrects on-screen vertical stripes.

Modifications of Embodiment

Now, description will be given of modifications of the present embodiment.

In a shading correction circuit having the same configuration as that of the embodiment, for example, the blocks 19 in the upper optical black part 7 may be formed to overlap one another by shifting one pixel each in a horizontal direction. In this example, the number of blocks 19 is the same as that of pixels on a horizontal line. It is therefore possible to obtain correction coefficients for every pixel without interpolation. That is, the shading correction coefficients $C_n$ of the respective pixels correspond to the values obtained by subtracting offsets from the average values of the respective blocks.

Moreover, although in this embodiment the shading variation amounts are generated through linear interpolation of the average values of the respective blocks, curve interpolation may also be used.

In addition, although the image pickup device of XY addressing system (CMOS system or the like) is used in the embodiment, an image pickup device of CCD system may also be used.

Furthermore, the upper optical black part of the embodiment may be arranged on the lower side of the receptive surface.

The invention is not limited to the above embodiments and various modifications may be made without departing from the spirit and scope of the invention. Any improvement may be made in part or all of the components.

What is claimed is:

1. A shading correction circuit of an electronic camera, comprising:
    an image pickup device having photo detectors arranged on its receptive surface; and
    a shading correction part which performs shading correction on an output signal of said image pickup device, wherein:
        said image pickup device has an effective pixel area which has effective pixels arranged in two dimensions and performs photoelectric conversion on an object image to generate an image signal, and an upper optical black part which has light-shielding pixels arranged in a horizontal direction of said effective pixel area, the light-shielded pixels being read before any other image signal in said effective pixel area;
        said shading correction part has a correction coefficient generating part which extracts a variation in shading according to an output of said upper optical black part be fore an image signal of said effective pixel area is read and generates a correction coefficient for the variation, and a correction processing part which performs shading correction by using the correction coefficient on the image signal of said effective pixel area continuously read after the output of said upper optical black part;
        said correction coefficient generating part further has a block extracting part which extracts a block including a plurality of photo detectors from said upper optical black part, and a block average value generating part which calculates an average value of outputs of the photo detectors included in the block;
        said correction coefficient generating part generates the correction coefficient by using the average value;
        said block extracting part sections said upper optical black part into a plurality of blocks each including the plurality of photo detectors;
        said correction coefficient generating part further has an interpolation calculating part which determines an amount of variation in shading by interpolating the average value generated by said block average value generating part; and
        said correction coefficient generating part generates the correction coefficient by using the amount of variation in shading,
    said correction coefficient generating part further comprising:
        a variation determination part which determines a difference in amounts of variation in shading of each pixel and its horizontally adjoining pixel; and a random number generator for modifying variation points of the amounts of variation in shading with random numbers if the difference in the amounts of variation in shading is smaller than a predetermined value, wherein when a difference between amounts of variation in shading of each pixel and its horizontally adjoining pixel is smaller than the predetermined value, the variation points are arranged unevenly in a vertical direction of said effective pixel area.

2. The shading correction circuit of an electronic camera according to claim 1, wherein:

said random number generator exercises the random number modification when the difference in the amounts of variation in shading of each pixel and its horizontally adjoining pixel is smaller than 1 LSB.

3. A shading correction circuit of an electronic camera, comprising:

an image pickup device having photo detectors arranged on its receptive surface; and a shading correction part which performs shading correction on an output signal of said image pickup device, wherein:

said image pickup device has an effective pixel area which performs photoelectric conversion on an object image to generate an image signal, and an upper optical black part formed in a horizontal direction of said effective pixel area; and said shading correction part has a correction coefficient generating part which extracts a variation in shading according to an output of said upper optical black part and generates a correction coefficient for the variation, and a correction processing part which performs shading correction on the image signal by using the correction coefficient, wherein:

said correction coefficient generating part further has:

a block extracting part which extracts a block including a plurality of photo detectors from said upper optical black part and sections said upper optical black part into a plurality of blocks each including the plurality of photo detectors;

a block average value generating part which calculates an average value of outputs of the photo detectors included in the block;

an interpolation calculating part which determines an amount of variation in shading by interpolating the average value generated by said block average value generating part;

a variation determination part which determines a difference in amounts of variation in shading of each pixel and its horizontally adjoining pixel; and a random number generator for modifying variation points of the amounts of variation in shading with random numbers if the difference in the amounts of variation in shading is smaller than a predetermined value, wherein when a difference between amounts of variation in shading of each pixel and its horizontally adjoining pixel is smaller than the predetermined value, the variation points are arranged unevenly in a vertical direction of said effective pixel area.

4. The shading correction circuit of an electronic camera according to claim 3, wherein:

said random number generator exercises the random number modification when the difference in the amounts of variation in shading of each pixel and its horizontally adjoining pixel is smaller than 1 LSB.

* * * * *

UNITED STATES PATENT AND TRADEMARK OFFICE
CERTIFICATE OF CORRECTION

PATENT NO. : 7,652,698 B2
APPLICATION NO. : 10/843433
DATED : January 26, 2010
INVENTOR(S) : Akihiko Morishita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1424 days.

Signed and Sealed this

Twenty-eighth Day of December, 2010

David J. Kappos
*Director of the United States Patent and Trademark Office*